Patented Jan. 14, 1941

2,228,920

UNITED STATES PATENT OFFICE 2,228,920

PROCESS OF PREPARING 5-HYDROXY-TRIMELLITIC ACID

Wilhelm Eckert and Karl Schilling, Frankfort-on-the-Main-Hochst, Germany, assignor to General Aniline & Film Corporation, a corporation of Delaware No Drawing. Application June 13, 1938, Serial No. 213,457. In Germany June 17, 1937

3 Claims. (Cl. 260—521)

The present invention relates to a process of preparing 5-hydroxy-trimellitic acid.

We have found that the industrially valuable 5-hydroxy-trimellitic acid is obtained by treating a 5-halogen-pseudocumene, obtainable for instance by halogenating pseudocumene, with an oxidizing agent and heating the hitherto unknown 5-halogen-trimellitic acid thus obtained with an alkali or an agent having an alkaline action.

The 5-hydroxy-trimellitic acid is useful as parent material for the production of dyestuffs which can be chromed.

The following examples serve to illustrate the invention, but they are not intended to limit it thereto, the parts are by weight, unless otherwise stated; the relationship between parts by weight and parts by volume is that which exists between the kilo and the liter.

(1) 77 parts of 5-chloro-pseudocumene, about 300 parts of pyridine and about 150 parts of water are heated together at 50° C. to 60° C., while well stirring, and at this temperature about 55 parts of potassium permanganate are added. The temperature immediately rises and is kept at 85° C. to 95° C. by further introduction of potassium permanganate. In the course of the oxidation 900 parts of water are gradually added. Oxidation is continued until the color of the potassium permanganate remains for a prolonged period this requiring about 500 parts of it in all. Any excess of potassium permanganate is destroyed by means of bisulfite lye, the hot solution is filtered with suction from the separated manganese dioxide; the manganese dioxide is once or twice extracted with boiling water. The filtrates, in which the 5-chloro-trimellitic acid obtained is dissolved, are combined and concentrated to about 500 parts. On addition of concentrated hydrochloric acid until the reaction is acid to Congo paper the 5-chloro-trimellitic acid is precipitated. After cooling, the product is filtered with suction, washed with hydrochloric acid of about 13 per cent. strength and dried under reduced pressure. The 5-chloro-trimellitic anhydride melts at 192° C. to 194° C. and crystallizes, for instance, from chlorobenzene in the form of prisms.

(2) 69 parts of the tri-sodium salt of the 5-chloro-trimellitic acid are introduced at 120° C. into a melt containing 200 parts of caustic soda and 40 parts of water; within 2 hours the temperature of the melt is raised to 200° C. The product is dissolved in about 1250 parts of water and acidified with concentrated hydrochloric acid until the whole has become strongly acid to Congo paper whereupon the 5-hydroxy-trimellitic acid crystallizes on cooling; if desired, it may be recrystallized from dilute hydrochloric acid. It is filtered with suction, washed and dried.

(3) 93 parts of the sodium salt of 5-chloro-trimellitic acid, 90 parts of piperidine, 300 parts of water and 1 part of copper bronze are heated at 130° C. to 140° C. for about 4 hours. The copper is then filtered and the aqueous piperidine solution is evaporated. The residue is taken up in a small amount of hot water and rendered strongly acid to Congo paper with concentrated hydrochloric acid. When the whole has completely cooled, the 5-hydroxy-trimellitic acid obtained is filtered with suction and recrystallized from 400 parts of hydrochloric acid of 4 per cent. strength.

(4) On oxidizing 103 parts of the 5-bromo-pseudocumene, obtainable by bromination of pseudocumene, in a mixture of about 500 parts of pyridine and about 500 parts of potassium permanganate and subsequently working up the whole as described in Example 1, the hitherto unknown 5-bromo-trimellitic acid is obtained.

It may be transformed, as indicated in Examples 2 and 3, into the 5-hydroxy-trimellitic acid.

We claim:

1. The process which comprises treating the compound of the formula

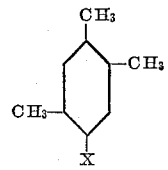

wherein X represents a halogen atom of the group consisting of chlorine and bromine with an oxidizing agent and heating the halogen-phenyl-tricarboxylic acid thus obtained at a temperature of between about 120° C. and about 200° C. together with an alkaline agent to form the corresponding hydroxyphenyl-tricarboxylic acid.

2. The process which comprises oxidizing with potassium permanganate solution at about 85° C. to about 95° C. in the presence of pyridine the compound of the formula

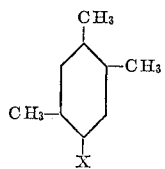

wherein X represents a halogen atom of the group consisting of chlorine and bromine to form the corresponding halogenphenyl-tricarboxylic acid and heating it at a temperature of between about 120° C. and about 200° C. together with an alkaline agent to form the corresponding hydroxyphenyl-tricarboxylic acid.

3. The process which comprises oxidizing with potassium permanganate solution at about 85° C. to about 95° C. in the presence of pyridine the compound of the formula

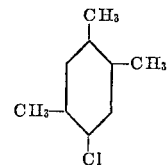

to form the corresponding chlorophenyl-tricarboxylic acid and treating its trisodium salt for about 2 hours at about 200° C. in a caustic soda melt.

WILHELM ECKERT.
KARL SCHILLING.